Sept. 9, 1924.
S. R. WAREING
INDICATING DEVICE
Filed Dec. 20, 1922
1,507,644
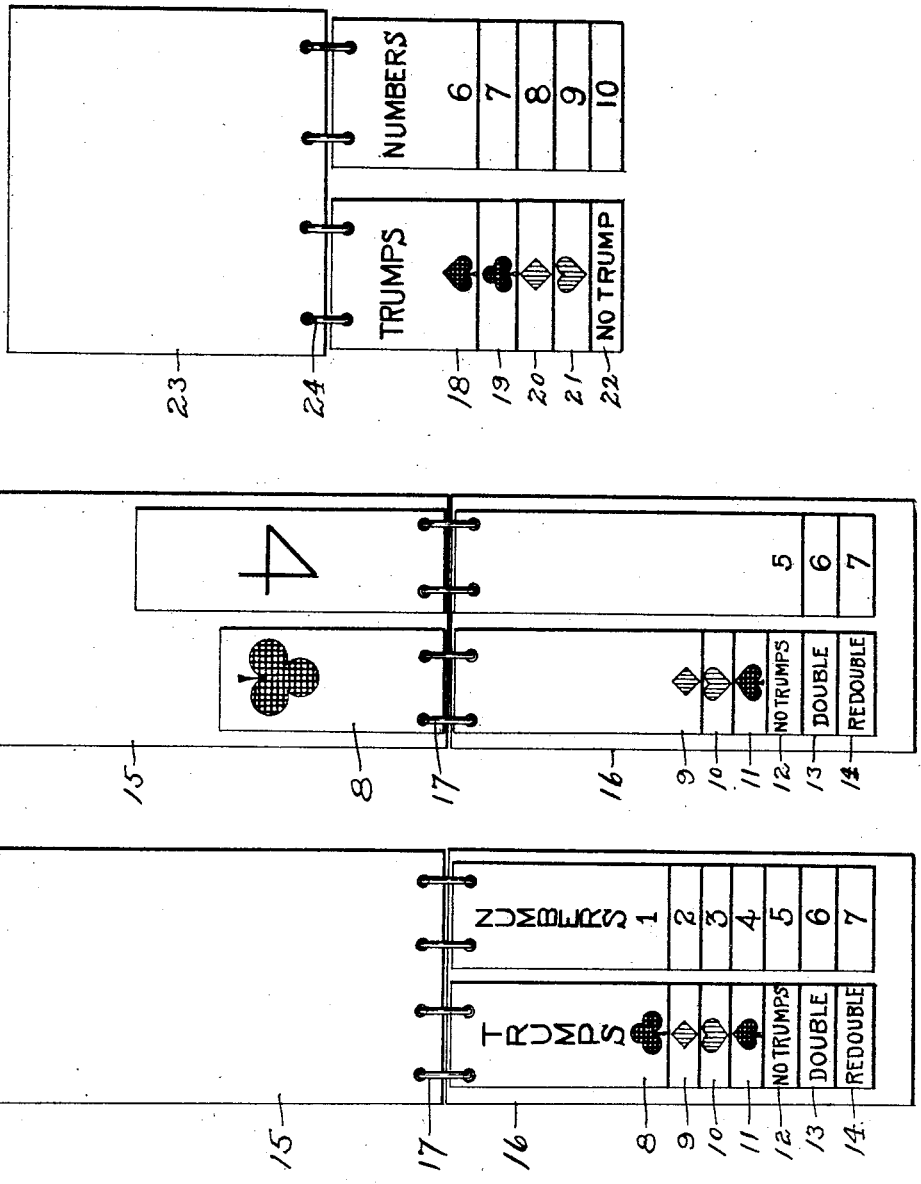
INVENTOR
*Saidee Reeve Wareing.*
BY
*Lewis J. Doolittle*
ATTORNEY Patented Sept. 9, 1924.

1,507,644

UNITED STATES PATENT OFFICE.

SAIDEE REEVE WAREING, OF MAPLEWOOD, NEW JERSEY.

INDICATING DEVICE.

Application filed December 20, 1922. Serial No. 608,015.

*To all whom it may concern:*

Be it known that I, SAIDEE REEVE WAREING, citizen of the United States, and resident of Maplewood, in the county of Essex and State of New Jersey, have invented certain new and useful Improvements in Indicating Devices, of which the following is a specification.

This invention relates to an indicating device adapted for various uses. In the particular arrangement herein shown, the device is arranged to indicate the "bids" of the players in a card game, and in this connection it has been aptly called "the silent bidder", which is expressive of the object and nature of the invention in this connection or adaption especially.

The device comprises a plurality of independent groups of indicators relatively arranged and positioned to permit any indicator of any one group to be used with any indicator of another group.

In the drawings, in which the invention is illustrated as embodied in an indicator for use in card games, Fig. 1 is a plan view showing the device in position to be used by the player but before being operated, which may be termed the ineffective position. Fig. 2 is a plan view showing the indicators in position to indicate the "bid", which may be termed the effective position. Fig. 3 is a plan view of the device, similar to Fig. 1, arranged for a different card game.

Figs. 1 and 2 illustrate the device as arranged for the game of "bridge" and Fig. 3 for the game of "five hundred".

The device as here illustrated in Figs. 1 and 2 comprises two series of independent groups of indicators, each group consisting of a series of cards, of any suitable material, of convenient size, one group being shown by the markings of the numbers 1 to 7, inclusive, and the other by the several markings indicating the card suits, "No trumps", etc., this latter group also having been given the reference numerals 8 to 14, inclusive.

Covers 15 and 16 may also be provided and hinged together at one end with the indicators there-between by the rings 17, as shown, which arrangement permits any indicator of either group to be reversed in position in conjunction with any indicator of the other group.

The successive indicators of each group project beyond the preceding indicator and each bears an index marking on its projecting portion, so that all of these markings are visible. For instance, as shown in Fig. 1, one group bears the index markings for the numbers 1 to 7, inclusive, while the other group (8 to 14, inclusive,) bears the successive card suit markings: clubs, diamonds, hearts, spades, "No trumps", "Double", "Re-double", on the successive indicators, which, correspondingly, are of increasing length for the increasing value of the markings, thus rendering the selection more easily made.

Indicator markings are provided on the reverse side of each indicator corresponding to the index markings just described.

Each player is provided with one of these devices, which is placed on the table in convenient position with the top cover 15 open and all of the index markings visible to the player, the lower end of the indicator, as shown in Fig. 1, being nearest to the player.

When a bid is to be made, the player selects from the index markings the combination to indicate the bid and reverses these, and the preceding indicators, thus exposing the indicator markings on the reverse side of the selected indicators to the other players. For instance, as shown in Fig. 2, the bid is "four clubs", as shown by the indicator markings on the reverse side of the indicators 4 and 8 of the two groups thus exposed and visible to the other players.

On the back of the cover 16, the word "Pass" may be placed, if desired, or the player may indicate a pass of the bid by closing the covers, or otherwise.

In the arrangement shown in Fig. 3, one group of indicators bears the markings for the numbers 6 to 10, inclusive, and the other group the successive card suit markings: spades, clubs, diamonds, hearts, "No trump", with corresponding indicator markings on the reverse sides thereof. One top cover 23 is provided and a ring hinge 24. The operation is the same as that just described for the arrangement shown in Figs. 1 and 2.

It will be obvious that when this device is used, any question as to a player's bid is avoided and, also, all preceding bids are indicated by the respective devices in front of each player. This is of great assistance to the concentrated thought of the players, on account of the avoidance of verbal questions which heretofore have been the generally unavoidable result of dependence on the memory as to the verbal bids.

While this device has been primarily designed and is specially adapted for use in card games, as herein described and shown, it will be apparent that many changes could be made in the construction and arrangements shown and many apparently widely different embodiments of the invention designed without departing from the scope of the appended claim. I intend that all matter contained in the above description or shown in the accompanying drawings shall be interpreted as illustrative merely of an operative embodiment of my invention and not in a limiting sense.

What I claim is:—

An indicating device comprising a plurality of independent groups of indicators of successively increasing size provided with indicator markings of increasing value for the successive indicators of each group, and the groups being relatively arranged and adapted to permit any indicator of any one group to be placed in effective position in conjunction with any indicator of another group to render the respective indicator markings visible on the said indicators when placed in effective position.

Signed at New York, in the county of New York and State of N. Y., this 11th day of December, A. D. 1922.

SAIDEE REEVE WAREING.